Nov. 21, 1967  J. H. LEMELSON  3,353,897

DISPLAY DEVICES

Filed Oct. 23, 1965

INVENTOR.
Jerome H. Lemelson
BY
Philpitt, Steininger & Priddy
ATTY's.

3,353,897
DISPLAY DEVICES
Jerome H. Lemelson, 85 Rector St.,
Metuchen, N.J. 08840
Filed Oct. 23, 1965, Ser. No. 503,982
5 Claims. (Cl. 350—167)

The present invention relates to display devices of the reflecting type made of light-transmitting sheet material which, due to the irregular formation thereof, present display areas which appear to an observer to vary in brightness or change color due to variable reflecting effects provided primarily by variations in the shape of the sheet material. This is a continuation-in-part of my co-pending application Serial No. 360,954, filed June 11, 1953, now abandoned, and entitled "Display Devices."

It is known in the art to provide one surface of a single or compound transparent sheet material with lenticles to provide various optical illusions such as the illusion of depth. While the optical effects produced thereby may be pleasing to the eye, they are nevertheless relatively limited in application and design. I have discovered that, by providing a flexible or rigid transparent sheet material having elongated lenticular formations of semicylindrical or other suitable lens shape in both surfaces of a transparent sheet, various optical effects may be derived which are quite different from those derived from sheet material embossed on one surface, due to refraction within the sheet and reflection off the rear surface thereof. By properly designing and positioning lenticular embossments and/or irregular formations in opposite faces of a transparent sheet and providing the rear surface of the sheet in a highly reflective condition, display devices may be fabricated which are eyecatching, reflex reflecting, and provide the illusion of movement or variation in reflectivity of certain areas of the display to an observer moving relative thereto.

The art is familiar with advertising or amusement display devices comprising a single or a compound sheet of transparent material having on one surface a series of parallel ribs of parallel cross-section with substantially no spacing between them. At the back of the sheet are a plurality of image bars in a plurality of sets, spaced apart from one another and varying from one another in color or character or both for defining a plurality of figures or images which appear in alternation with one another to the eye of an observer who is moving with respect to the front surface of the sheet. Heretofore, the conventional practice has been to print the image bars with paint on the back surface of the lenticular sheet itself or upon an opaque backing sheet such as paper or cardboard, the latter being assembled or bonded in face-to-face relationship with the generally flat back surface of the lenticular sheet, through which the image bars may be viewed. I have found, however, that it is possible to provide image bars, figures, indicia and patterns by proper formation of the rear surface of the lenticular sheet itself, thus obviating the need for a separate printed backing member or printed indicia on the back of the lenticular sheet, thus eliminating an element of said known lenticular display devices while retaining the function thereof. The invention provides observable areas of the sheet material in the form of bright and dark regions which result primarily from shaping both surfaces of the sheet in a manner to refract a portion of the light entering the sheet and direct same to shaped portions of the rear surface of the sheet which are operative to reflect the light back to the observer while other portions of the light are refracted against portions of the rear surface of the sheet which do not reflect it back to the observer resulting in a scattering or interference effect. The lenticular formations may be such as to provide the illusion of movement of the areas of different light reflectivity as the observer moves relative to the sheet or the sheet is moved relative to the observer. Optical effects derived from sheet materials made in accordance with the teachings of the invention may be quite striking, pleasing to the eye and eyecatching. It is also apparent that the invention provides a way of circumventing the problems arising out of the general tendency of printing inks and paints to be difficultly adherent to the transparent materials, such as plastic or glass, of which lenticular sheets are ordinarily fabricated.

Accordingly, it is a primary object of this invention to provide new and improved display devices comprising a single or compound sheet of transparent material having lenticular elements on both the major surfaces thereof.

Another object of this invention is to provide a new and improved display material in the form of a thin sheet of plastic having embossments on both the major surfaces thereof which cooperate in refracting and reflecting light entering the sheet so as to provide eyecatching optical effects to an observer disposed in front of one surface of the sheet.

Another object is to provide an improved display material which may be fabricated at low cost of relatively inexpensive plastic sheeting and which may be utilized to provide eyecatching optical effects for the production of a variety of articles thereof.

It is a further object of this invention to provide display devices of the reflex type which exhibit changes in optical composition of light reflected thereof such as the illusion of movement or interruption of said light when an observer moves relative to the device.

Another object is to provide an improved lenticular sheet material with surface formations so designed to provide areas observable from one side of the sheet which are highly reflective and adjacent areas which are highly absorbing of light entering the sheet so as to yield light contrasting display areas.

The above brief description as well as further objects, features and advantages of the present invention will be best appreciated by reference to the following detailed description of preferred embodiments, when taken in conjunction with accompanying drawing wherein.

Figure 1:
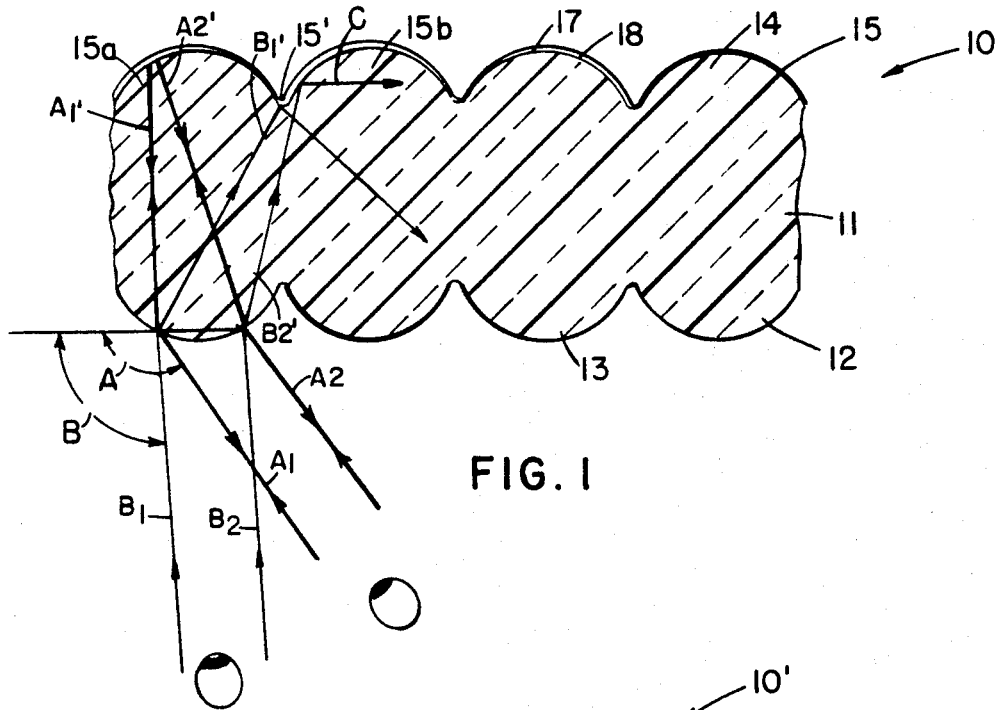
FIGURE 1 is a sectional view of a first embodiment of the present invention capable of providing observable areas of different light reflectivity and the illusion of depth to a person viewing the sheet.

There is shown in FIGURE 1 a display device 10 in the form of a thin sheet of transparent material such as plastic or glass, preferably varying in thickness in the range of about .005" to about .050" although, in certain instances, it may be desirable to produce materials of slightly great or less thickness. In a preferred embodiment, the device 10 may comprise a sheet 11 made of a flexible or rigid transparent polymer, copolymer or graft polymer, such as polyvinylchloride, methylmethacrylate, cellulose acetate butyrate, polyvinyl acetate polystyrene, polycarbonate, polyethylene or the like. One surface of sheet 11 is provided with a plurality of elongated, parallel lenticular formations 12 preferably embossed or extrusion formed therein while the other surface of said sheet contains a plurality of lenticular formations 14 extending parallel to each other and preferably parallel to the formations 12, although in certain instances, certain desired optical effects may be obtained by extending portions of either or both of the surface lenticular formations in directions other than parallel to those on the opposite surface of the sheet. Reference numerals 13 and 15 respectively identify the surfaces of the lenticular formations 12 and of the lenticular formations 14 in the opposite surface of sheet 11. Sheet 11 may be formed from a single sheet of calendered cast or extruded plastic. Both surfaces thereof may be embossed either simultaneously or at different times. Said sheet may also be laminated from a plurality of sheets of plastic, e.g. two sheets, each with one flat surface brought into abutment with one another and each having respective parallel formations 12 and 14 embossed in their outer surfaces prior or subsequent to or during the lamination of the two together.

In order for the desired optical effects to be derived, both of the exposed (lenticular) surfaces of the sheet should be highly reflective, e.g. relatively smooth or glossy. The desired smoothness and glossiness may readily be imparted thereto during the embossing or extruding operation. If the surface 13 is that facing the observer, the reflective characteristics of surface 15 may be enhanced by coating same with a highly reflective material such as metal. The metal may be applied in a thin layer, as by vapor deposition, or as a thin film on a sheet of plastic film which is bonded to surface 15. If a thin film 17 of metal is vapor deposited or otherwise provided on surface 15, further processing may include coating the outer surface thereof with a suitable plastic 18 to protect same from abrasion or weathering during handling or use.

Depending on the shape of the lenticular formations 12 and 14, which may be semicylindrical or portions of cylindrical surfaces or may be otherwise shaped, such as elliptical or parabolic in shape, and the relative sizes of and positions of the formations on one surface with respect to those on the other, various optical effects may be derived. For example, assuming that the notations A1 and A2 refer to light rays entering the observed surface 13 of the sheet 11 at a particular angle A between the observer and the front face of the sheet, it will be observed that these rays may be focused as extensions A1' and A2' thereof within the sheet substantially at or near the rear surface 15 of a lenticular formation in alignment with that which receives the rays. The resulting effect is to cause the light to be reflected back to the observer along substantially the path of entry, so that the observer sees a bright band or area of light defined by the area between rays A1 and A2. At a different angle B, a second pair of light rays B1 and B2 which are similar in intensity to A1 and A2 will be directed against the same lenticular formation 12 receiving rays A1 and A2 but will be focused thereby near the junction or intersection 15' of lenticular formations 15a and 15b. A portion if not all of the light defined between rays B1 and B2 is reflected in a direction other than that from which it is directed against the rear surface 15 of the sheet, resulting in scattering thereof as indicated by arrows C, and $C_2$, and a substantial reduction in reflectivity. Thus, the area between B1 and B2 appears as a dark image to the observer and will actually appear to move as the observer moves relative to sheet 11. Depending on the thickness of the sheet 11 and the shape of the lenticular formations in both surfaces thereof, variations in reflectivity or light viewed by an observer may include clear bands of reflected light and dark areas in the form of fringe patterns, which bands may also extend completely across the sheet to provide a total or substantially total on-off effect which changes as the line of sight of the observer with respect to the sheet changes.

Figure 2:
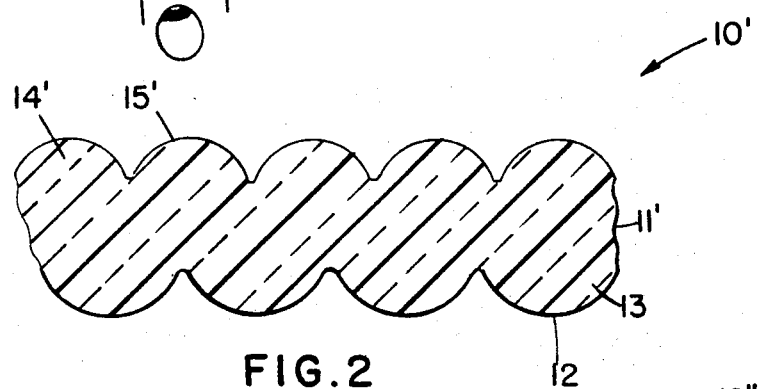
FIGURE 2 is a sectional view of a second embodiment of the present invention likewise capable of producing variable optical effects.

Whereas in FIGURE 1, the lenticular formations 12 and 14 are on both surfaces of the display sheet 11 and were provided of substantially similar shape and in parallel alignment with each other. In FIGURE 2, the lenticular formations 14' and 15' in the rear surface of the sheet 11' are substantially smaller in diameter than the formations 12 in the front surface thereof, providing a different optical effect than that which would be obtained in viewing the device of FIGURE 1. Lenticular formations 14' and 15' of FIGURE 2 are shifted or laterally misaligned with respect to formations 12, so as to provide the observer with an optical phenomenon comprising a band-like dark area extending parallel to the lenticular formations where light is scattered or interfered with as a result of the irregular reflection or interference fringes formed within the sheet. It is noted that the lenticular formations 12, 14' and 15' may extend as a series of straight, parallel formations or in any desired path or paths throughout the sheet depending on the desired reflective effect.

Figure 3:
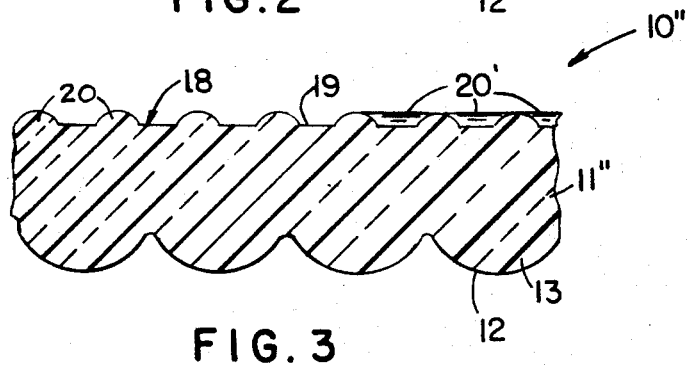
FIGURE 3 is a sectional view of a third embodiment of the invention.

In FIGURE 3 is shown another form of the invention employing a plurality of lenticular formations 12 in a first side of a sheet 10'' of reflective display material and a plurality of substantially smaller lenticular formations 20 protruding outwardly from a second side 18 of the sheet. The semicylindrical formations 20 are laterally spaced apart from each other with flat areas 19 therebetween which serve to reflect light entering the sheet through formations 12 in a different manner than the reflection of light by lens formations 20. In other words, light which enters sheet 10'' of FIGURE 3, and which is focused substantially at or near the lenticular formations 20 therein will be reflected back through the sheet along substantally the path of entry whereas light focused substantially at or near the flat formations 19 will be reflected back into the sheet along different paths so as to provide areas of different reflectivity than the areas defined by the lenticular formations 20.

Reflective material such as vaporized metal may be disposed on the rear surfaces of the display devices 10' and 10'' of FIGURES 2 and 3 as in the FIGURE 1 embodiment and may be coated or covered with further material as described to provide durable, simple, readily manufactured eyecatching, reflex reflecting sheet materials having predetermined patterns of light reflecting surfaces interposed between or disposed adjacent surfaces which scatter, absorb or reflect lesser degrees of light.

It should be apparent that the lenticular and light-scattering formations 14, 14', 18 and 19 of FIGURES 1 through 3 may be so shaped and spaced, and of such a shape and direction, as to provide such optical effects to an observer viewing the other face of the sheet as to form images by diffraction and reflection of light, which images may have any contour or shape. Such images, which will comprise shadow-like dark areas produced by light scattering and interposed between areas of greater brightness, may comprise indicia such as alpha-numeric characters, line drawings, figure images, scenes or other illustrations which appear to shift in position as the angle between the line of sight of the observer and the front face of the sheet varies. In another form, the formations 14, 14', 18 and 19 or other suitably shaped formations in said rear face of said sheet may be so shaped, spaced and disposed as to provide a plurality of images in the form of bright and dark areas, one image being viewable at a time depending on the viewing angle which one image changes in characteristic as the angle of the observer's line of sight varies with respect to the front face of the sheet. This may result in partial change in the image content or in a complete shift from one image pattern to another. For example, formations 18 and 19 of FIGURE 3 may be formed in such size, direction and relative spacing as to provide two distinct patterns of image bars each pattern being distinct from the other in shape and each viewable by an observer at one or more angles which are different than the angles at which the other pattern is viewed. One pattern may comprise, for example, dark areas shaped to provide the word "STOP" while the other pattern may form the word "AT JOE'S." Thus, changing image effects of the types described in U.S. Patent 1,475,430 may be derived by means of properly embossing both faces of a sheet of clear plastic without the need to print thereon or laminate printed material thereagainst.

It should also be understood that the image effects of the embodiment shown in FIGURE 3 may also be enhanced by modifying the flat areas 19 to give them light-absorbing or light scattering properties, such as by frosting, knurling, scarifying or otherwise treating them or by replacing them with gullies which may be similarly treated. Also, some of the lenticular formations 20' in the rear surface of the sheet 11" may be nonparallel or askew with respect to the remaining formations 20. It is apparent therefore that the present invention is a broad one and is not to be limited to the exact detailed embodiments hereinbefore described, except as required by the appended claims.

I claim:

1. An improved multipatterned display device operative to provide a variable light pattern to an observer which appears to shift as the angle between the observer and the device varies, comprising:
   (a) a relatively thin sheet of transparent material having a front face and a rear face;
   (b) a plurality of first transparent, parallel, elongated and closely spaced lens formations in said front face;
   (c) a plurality of second elongated lens formations in said rear face parallel to said first lens formations and having a highly reflective coating thereon for reflecting the light which enters said sheet to a given observation point with a first brightness; and
   (d) at least one third formation in said rear face interposed between said second formations and differing therefrom for reflecting the light which enters said sheet to a given observation point with a second brightness which is of less intensity than said first brightness.

2. A display device in accordance with claim 1 wherein said at least one third formation is a light absorbing surface.

3. A display device in accordance with claim 1 wherein said at least one third formation is a light scattering surface.

4. In a multipatterned display device having a relatively thin sheet of transparent material including a front surface and a rear surface, a plurality of closely-spaced elongated parallel front lens formations in said front surface for converging light rays within the sheet and for focusing the rays substantially at the rear surface of the sheet, and a plurality of elongated parallel rear lens formations disposed in said rear surface for variably reflecting light rays focused by said front lens formations whereby the device varies in appearance to an observer in relative motion across the field of the device, the improvement characterized in that a first portion of the lens formations in said rear surface are elongated parallel lens formations which extend parallel to those in said front surface and a second portion of the lens formations in said rear surface are elongated parallel lens formations which extend in non-parallel relationship to those in said front surface, whereby said parallel and non-parallel rear lens formations reflect light back through the sheet in different directions to provide areas of brightness and darkness to said observer.

5. In a multipatterned display device having a relatively thin sheet of transparent material including a front surface and a rear surface, a plurality of closely-spaced elongated parallel front lens formations in said front surface for converging light rays within the sheet and for focusing the rays substantially at the rear surface of the sheet, and a plurality of rear surface formations disposed in said rear surface for variably reflecting light rays focused by said front lens formations, whereby the device varies in appearance to an observer in relative motion across the field of the device, the improvement characterized in that a first portion of the surface formations in the rear surface of the sheet are elongated parallel rear lens formations and a second portion of the rear surface formations are other formations differing from and interposed between said rear lens formations, said rear lens formations serving to redirect light back through the sheet along substantially the path of entry, said other formations serving to reflect light through said sheet at an angle other than that in which it is directed thereagainst to provide areas of different light intensity than the adjacent areas defined by said lens formations.

References Cited

UNITED STATES PATENTS

| Re. 19,070 | 2/1934 | Chretien | 88—1 |
| 1,918,705 | 7/1933 | Ives | 88—82 |
| 2,002,090 | 5/1935 | Ives | 88—1 |
| 2,303,113 | 11/1942 | Eckel | 88—82 |
| 2,351,034 | 6/1944 | Gabor | 88—82 |
| 2,499,453 | 3/1950 | Bonnet | 88—1 |
| 2,639,918 | 5/1953 | Hotchner | 88—1 |

JEWELL H. PEDERSEN, *Primary Examiner.*

O. B. CHEW, *Assistant Examiner.*